Patented July 6, 1954

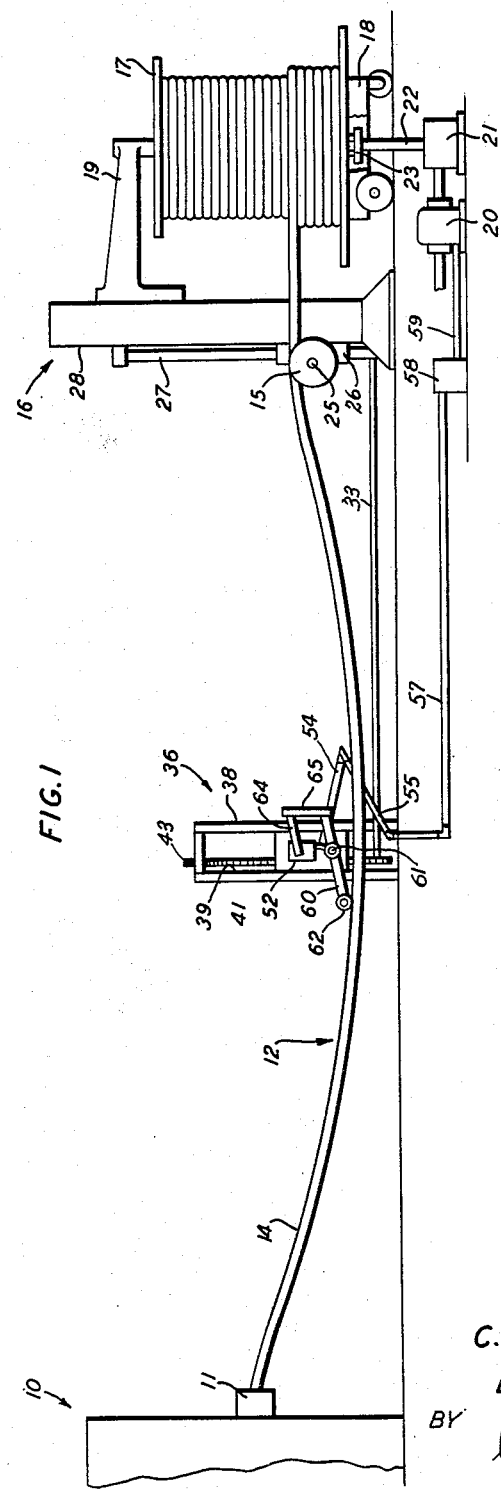

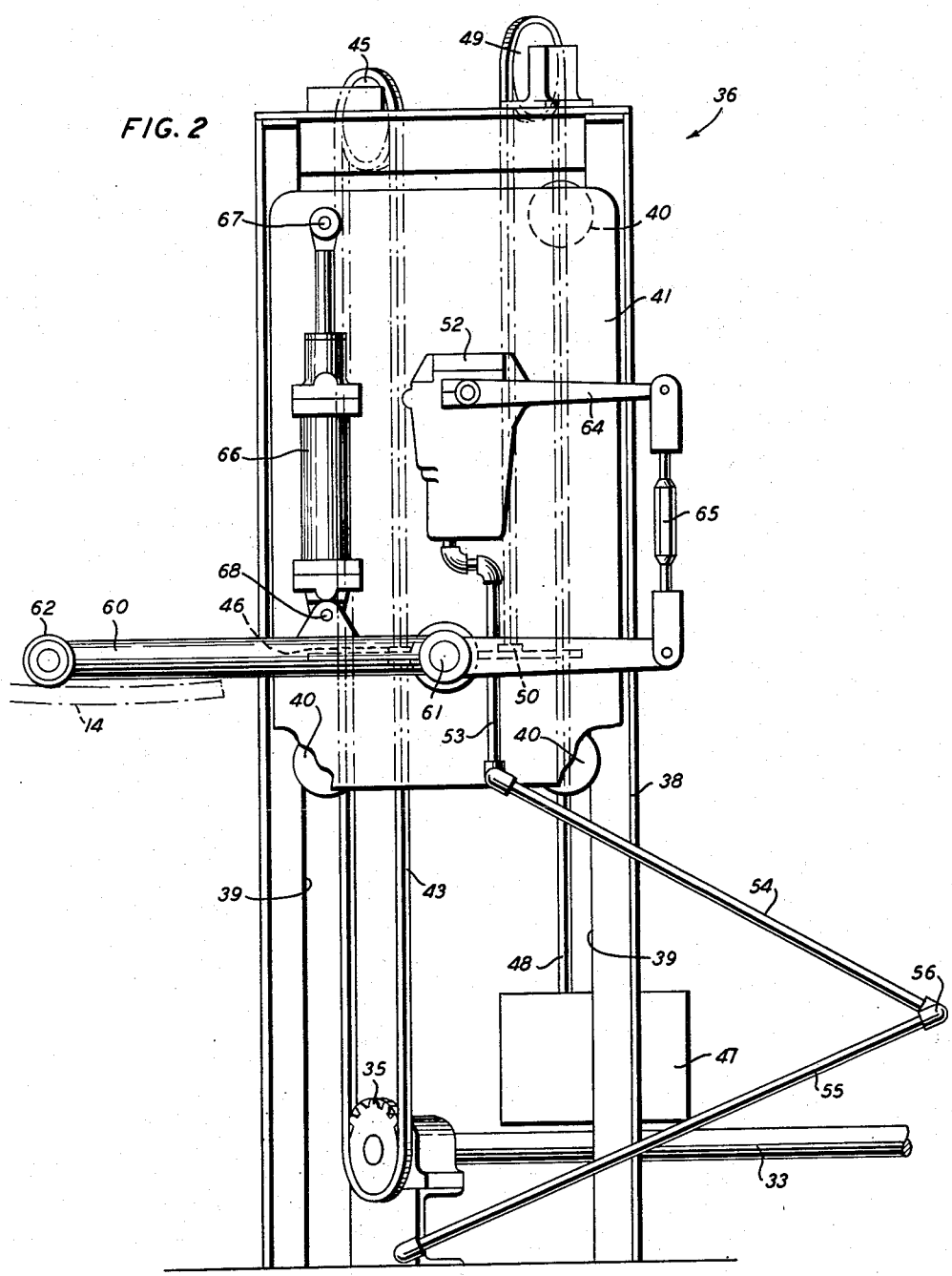

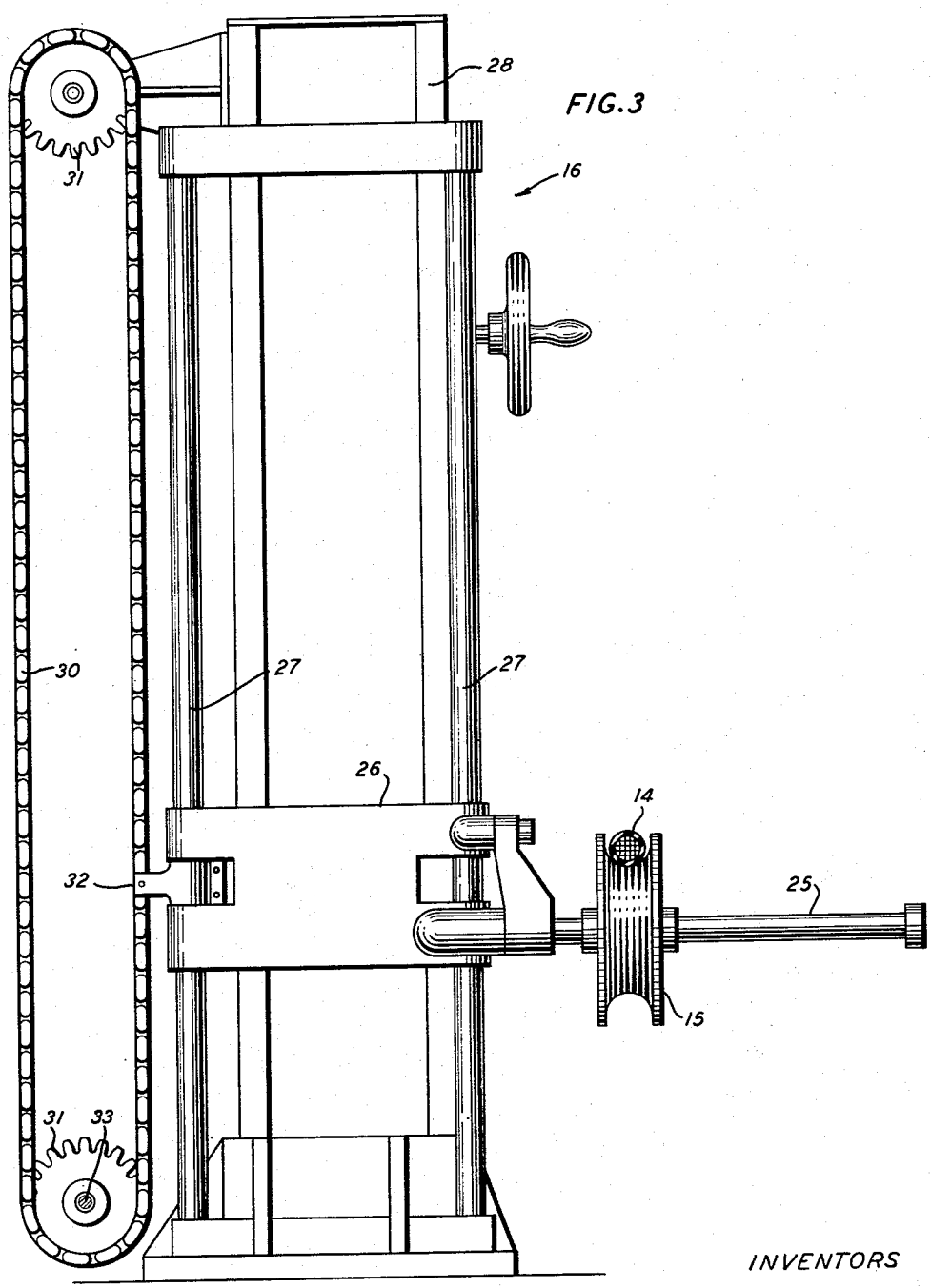

2,682,997

UNITED STATES PATENT OFFICE 2,682,997

TAKE-UP CONTROL MECHANISM

Clarence Edwin Magnuson, Hasbrouck Heights, and Daniel Vaughn Waters, Flemington, N. J., assignors to Western Electric Company, Incorporated, New York, N. Y., a corporation of New York Application November 2, 1950, Serial No. 193,714

2 Claims. (Cl. 242—25)

1

This invention relates to apparatus to control the catenary of a material and more particularly to an apparatus for controlling the catenary of cable between a supply and a takeup therefor.

In taking up strands or materials of lighter weight than sheathed cables, conventional tensioning means are employed to maintain the desired tension in the strands, and in such instances the strands are held taut as they travel between supply and takeup. However, in the manufacture of cable, the cable is released at a constant rate from a supply, for example, the extruder which forms the protective sheath thereon. In taking up cables on reels the weight of the cable alone suspended between the supply and the takeup creates all the tension that is needed to wind the cable uniformly on the reel. Furthermore, if the cable is pulled taut between the supply and takeup, so much tension would be created in the cable that the sheath would be broken. It has therefore proven advantageous to create and maintain a catenary of a given contour in the cable between the supply and takeup. This has been made difficult in that, although the supply may be at a fixed position, the other end of the catenary determined by the position of the distributor is continuously varying during its reciprocable movement to distribute the cable on the takeup reel.

An object of the invention is to provide an apparatus which is simple in structure, accurate in operation, and highly efficient in controlling the catenary of a material, particularly cable.

With this and other objects in view the invention comprises an apparatus to control the catenary of a material while advancing longitudinally at a constant speed between a stationary supply and a reciprocal distributor for a takeup driven by a variable speed motor, the apparatus including a control unit movable on a support while the mechanism operatively connects the support to the distributor to move the support at a given ratio of speed of movement of the distributor during which time an arm of the control unit rides on the material and is controlled thereby to operate the unit to cause variations in the speed of the motor with variations in the catenary.

In the present embodiment of the invention, the takeup reel is driven by a fluid motor, and if there should be no variation in the catenary, the control unit would remain inactive in that the arm riding on the material or cable would not be actuated. However, after one layer of cable is wound on the takeup reel and the distributor reverses its travel to start another layer, there will be a tendency to move the cable at a faster rate due to the increase in the ratio of the arm in the takeup reel causing variation in the catenary of the cable. This variation causes immediate actuation of the control unit through its arm, causing variation in the drive for the takeup reel, thus slowing down the drive until the catenary of the cable has returned to its given position, allowing the unit to return to its neutral position.

Other objects and advantages will be apparent from the following detailed description when considered in conjunction with the accompanying drawings, wherein:

Fig. 1 is a schematic side elevational view of a material supply and takeup unit embodying the invention;

Fig. 2 is a front elevational view of the control unit; and

Fig. 3 is a side elevational view of the distributor unit.

Referring now to the drawings, attention is first directed to Fig. 1 which illustrates a supply 10, which in the present embodiment of the invention is the exit end of an extrusion unit, the outlet 11 being disposed at a fixed position determining one end of the catenary 12 of the material or cable 14. The other end of the catenary 12 is determined by the position of a roller 15 of a distributor 16 as it is reciprocated vertically to distribute the cable onto a takeup reel 17. The takeup reel is supported by a truck 18 movable into and out of position where it is held in the conventional manner by an arm 19 supporting, for example, a spindle (not shown), removably located in the reel to assist in its rotation. The reel is rotated by a suitable power means which in the present embodiment of the invention is a fluid motor 20 connected if desired through a speed reducing unit 21 to a shaft 22 which may be removably connected through a clutch 23 to the reel 17.

The distributor 16 includes a shaft 25 for the roller 15 extending laterally from a carriage 26, the shaft being of sufficient length to allow the roller to move outwardly as the convolutions build up on the reel. The carriage 26 is supported by parallel rods 27 mounted in a frame 28 for vertical movement between given limits determined by the height of the reel. An endless chain 30 extending around sprockets 31 is connected at 32 to carriage 26 to cause reciprocation of the carriage during driving of one of the sprockets 31. The lowermost sprocket 31 is mounted on a reversely rotatable drive shaft 33, which may be connected to and driven by a reversible motor, to drive the chain 30 and with it the carriage 26 the necessary distances controlled by limit switches (not shown). The shaft 33 is also connected to a sprocket 35 of a central unit 36. The unit 36 as shown in Fig. 1 is mounted near the center of the catenary 12 and is composed of a framework 38 providing tracks 39 for spaced wheels 40 of a carriage 41. An endless chain 43 extending around the sprocket 35 extends also around a sprocket 45 rotatably mounted at the upper end of the frame 38. The chain 43 is connected to the carriage 41 at 46 so that driving of the chain will cause reciprocation of the carriage in its controlled path. A weight 47 connected to the lower end of a chain 48 serves to counterbalance the carriage 41, the other end of the chain 48 extending around a sprocket 49 and connected to the carriage at 50.

A commercially known fluid control unit 52 is mounted on the carriage 41 and is disposed in a fluid line 53. The fluid line includes relatively movable tubes 54 and 55 and their coupling 56 to permit movement of the unit 52. The tube 55 is connected through a fluid line 57 to a fluid responsive unit 58, this unit being connected to the fluid motor 20 through line 59. The unit 58 is a commercially known fluid operable unit responsive to the actions of the control unit to control the speed of the motor 20 causing it to vary with variations in the catenary. An arm 60 pivotally supported at 61 on the carriage 41 has one end supporting a roller 62 which rides on the top of the cable or material 14 adjacent the center of the catenary 12. The other end of the lever 60 is connected to an arm 64 of the control unit 52 by an adjustable link 65. A dashpot 66 having one end fixed at 67 to the carriage 41 and the other end connected at 68 to the lever 60 eliminates the possibility of vibrations or unusual motions causing actuation of the arm 60 and the unit 52, limiting the operation of the control unit to the variation in the catenary.

During the normal travel of the material or cable from the supply 11 to the takeup, particularly the distributor roller 15, the position of which controls the other end of the catenary, there will be noticeable changes in the catenary at the start of one layer of cable on the reel. When an empty reel is disposed in place, the starting up of the drive for the reel may create a disturbance in the catenary, but this is soon removed, stabilizing the catenary and therefore creating the desired wrapping of the cable on the reel through the actuation of the units 52 and 58 determined by the position of the lever arm 60. The arm 60 of the control unit 52 is normally urged counterclockwise, and if the cable should sag further, the control unit will affect the responsive unit 28 to cause an increase in the speed of the motor until the arm is returned to its neutral position. A similar but reverse action takes place when the arm 60 is moved clockwise beyond its normal position. When one layer of cable has been completed and another about to start, there will be an immediate change in the catenary 12 lifting the roller 62 to move the arm 60 about its pivot thus actuating the unit 52. The action of the unit 52 immediately affects the unit 58 to vary the speed of the motor 20, causing it to drive the reel at a slower speed required by the larger diameter upon which the convolutions are wound to compensate for the travel of the cable longitudinally at a constant rate of speed. So far the action of the unit 36 has been considered from a standpoint that the cable travels through substantially the same path between fixed ends of the catenary, but this is not true in the present embodiment of the invention in that one end of the catenary is constantly moving between given limits. Therefore, it is necessary to link the control unit 36 with the distributor so that the point of contact with the catenary, namely the roller 62, may move between known limits at a given ratio of the speed and distance of movement of the distributor. This is accomplished through the shaft 33 and the sprockets 35 and 45 which are different in size from the sprockets 31 to create the difference in ratio of the speed of movement of the distributor roller 15 and the carriage 41. With this mechanism it is therefore possible to have a unit directly under the control of the catenary of a material advancing at a constant rate between a fixed supply and a constantly movable takeup to maintain a uniform catenary in the material.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus to control the catenary of a material while advancing longitudinally at a constant speed between a stationary supply and a reciprocable distributor for a takeup driven by a variable speed motor, the apparatus comprising a unit actuable to control the speed of the motor, a carriage mounted for reciprocation in a path substantially parallel with the path of reciprocation of the distributor, a counterbalancing supporting mechanism for the carriage and unit, a mechanism operatively connecting the carriage to the distributor to reciprocate the carriage with the control unit at a given ratio of the speed of movement of the distributor, and an arm of the control unit riding on the material and controlled thereby to operate the control unit to cause variations in the speed of the motor with variations in the catenary.

2. An apparatus to control the catenary of a material while advancing longitudinally at a constant speed between a stationary supply and a reciprocable distributor for a takeup driven by a variable speed motor, the apparatus comprising a unit actuable to control the speed of the motor, a carriage mounted for reciprocation in a path substantially parallel with the path of reciprocation of the distributor, a counterbalancing supporting mechanism for the carriage and unit, a mechanism operatively connecting the carriage to the distributor to reciprocate the carriage with the control unit at a given ratio of the speed of reciprocation of the distributor, an arm of the control unit riding on the material and controlled thereby to operate the control unit to cause variations in the speed of the motor with variations in the catenary, and a unit supported by the carriage and connected to the arm to cushion the arm against actuation other than by variations in the catenary.

References Cited in the file of this patent

UNITED STATES PATENTS

| Number | Name | Date |
|---|---|---|
| 1,816,909 | Larsen | Aug. 4, 1931 |
| 2,190,529 | Bretschneider | Feb. 13, 1940 |
| 2,252,353 | Pierce | Aug. 12, 1941 |
| 2,271,416 | Davis et al. | Jan. 27, 1942 |
| 2,306,045 | Delano | Dec. 22, 1942 |
| 2,509,250 | Roberts | May 30, 1950 |